3,803,324
AMINO-GUANIDINE DERIVATIVES USEFUL FOR REGULATING BLOOD PRESSURE
Werner Winter and Max Thiel, Mannheim, Kurt Stoch, Wolfgang Schaumann, and Karl Dietmann, Mannheim-Waldhof, and Klaus Ritter, Mannheim, Germany, assignors to Boehringer Mannheim GmbH, Mannheim, Germany
No Drawing. Original application May 27, 1969, Ser. No. 828,366, now Patent No. 3,683,023. Divided and this application Jan. 3, 1972, Ser. No. 215,190
Claims priority, application Germany, July 9, 1968, P 17 68 867.4
Int. Cl. A61k 27/00
U.S. Cl. 424—326      8 Claims

ABSTRACT OF THE DISCLOSURE

Amino-guanidine derivatives constituting blood pressure regulating agents and being characterized by their ability to decrease blood pressure having the formula:

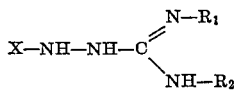

wherein $R_1$ and $R_2$ are each hydrogen or lower alkyl, and when joined together form alkylene containing 2 to 3 carbon atoms, and X is phenyl substituted by at least one halogen atom, and the salts thereof with pharmaceutically acceptable acids.

---

This is a division of application Ser. No. 828,366 filed May 27, 1969, now U.S. Pat. 3,683,023.

The present invention relates to novel amino-guanidine derivatives, methods of preparing and using the same.

The new amino-guanidine derivatives according to the present invention are compounds having the formula:

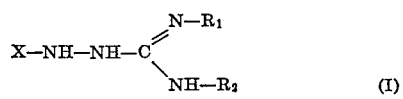

wherein $R_1$ and $R_2$, which may be the same or different, are each hydrogen atoms or lower alkyl and when $R_1$ and $R_2$ are joined together form alkylene containing 2 or 3 carbon atoms and X is phenyl substituted by one or more halogen atoms; and the salts thereof with physiologically compatible acids.

In accordance with the invention it has now been found that the new compounds (I) are valuable pharmaceuticals and can be successfully used for the regulation of the blood pressure and are particularly suitable for use in the treatment of hypertonias.

The new guanidine derivatives (I) can be prepared, for example, by the reaction of a hydrazine having the formula:

$$X\text{---}NH\text{---}NH_2 \qquad (II)$$

wherein X has the same significance as given above, either with an isourea derivative having the formula:

wherein Z is a reactive group which can easily be split off and $R_1$ and $R_2$ have the same significances as given above, or, if $R_2$ is hydrogen, with a cyanamide having the formula:

$$R_1\text{---}NH\text{---}CN \qquad (IV)$$

wherein $R_1$ has the same significance as given above, or if $R_1$ and $R_2$ are hydrogen or lower alkyl, by the reaction of a compound having the formula:

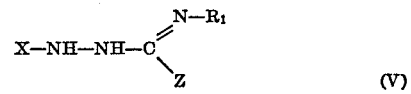

wherein $R_1$ is hydrogen or lower alkyl and X and Z have the same meanings as given above, with a compound having the formula:

$$H_2N\text{---}R_2 \qquad (VI)$$

wherein $R_2$ is hydrogen or lower alkyl. Thereafter, if desired, the products obtained are converted into their physiologically compatible salts.

As illustrative instances of group Z which can readily be split off, there can be mentioned for example, lower alkoxy, alkylmercapto, N-pyrazolyl, N-imidazolyl, N-triazolyl or N-tetrazolyl, as well as amino groups.

For the carrying out of the process according to the present invention, the Compounds II are reacted with the Compounds III or IV or the Compounds V, are reacted with the Compounds VI either by heating in a polar, inert solvent or, without the use of a solvent, simply by melting the components together, preferably in an atmosphere of nitrogen or in a vacuum.

Tetrahydrofuran has proved to be particularly useful as a polar, inert solvent.

The isolation of the reaction products is carried out by converting the same by the conventional methods into their physiologically compatible salts, for example, by neutralization with an appropriate organic or inorganic acid.

As examples of physiologically compatible salts, there may be mentioned, in particular, the hydrochlorides, hydrobromides, sulfates, phosphates, tartrates, citrates and oxalates of the free bases (I).

The following examples are given for the purpose of illustrating the present invention; the same are however, not to be construed as in any way limiting the scope thereof.

EXAMPLE 1

(3-chloroanilino)-guanidine 28.4 g. (0.2 mol) m-chlorophenyl-hydrazine were heated under reflux with 29.4 g. (0.2 mol) N-guanyl-pyrazole hydrochloride in 400 ml. tetrahydrofuran for 2 hours. The precipitate which formed was thereafter filtered off with suction. The crude product was recovered in a yield amounting to 95.5% of theory, was then recrystallized twice from alcohol. There were thusly obtained 23.7 g. (54% of theory) m-chloroanilinoguanidine hydrochloride which melted, with decomposition, at 198–199° C.

The following compounds were obtained in an analogous manner:

(3,4-dichloroanilino)-guanidine

The hydrochloride melted with decomposition, after recrystallization from alcohol/ether, at 239–240° C.; yield 93.7% of theory.

(2,4-dichloroanilino)-guanidine

The hydrochloride melted with decomposition after recrystallization from tetrahydrofuran/isopropanol, at 235–237° C.; yield 61% of theory.

(2,3-dichloroanilino)-guanidine

The hydrochloride melted with decomposition, after recrystallization from tetrahydrofuran, at 253–254° C.; yield: 76.6% of theory.

(4-fluoroanilino)-guanidine

The hydrochloride melted with decomposition, after recrystallization from isopropanol/ether, at 215–216° C.; yield 77.5% of theory.

EXAMPLE 2

(3-chloroanilino)-guanidine 7.1 g. m-chlorophenyl-hydrazine (0.05 mol) were first heated, while passing nitrogen through the mixture, with 7.7 g. S-methyl-isothiuronium bromide for 30 minutes at 120° C. and then for 30 minutes at 160° C. Thereafter, the base was freed by adding an aqueous solution of sodium bicarbonate to the reaction mixture. The base was extracted with ether and then precipitated as the hydrochloride by the addition of hydrogen chloride-containing ether. Following recrystallization from ethanol, there was obtained (3-chloroanilino)-guanidine hydrochloride having a melting point of 198–199° C. The yield amounted to 5 g. (45% of theory).

The following compounds were obtained in an analogous manner:

(2,5-dichloroanilino)-guanidine

The hydrobromide melted, after recrystallization from ethyl acetate/methanol, at 202–203° C.; yield: 51% of theory. (The crude hydrobromide was recrystallized directly from the melt obtained.)

(2,4,6-trichloroanilino)-guanidine

The hydrobromide melted, after recrystallization from methanol/ether, at 246–247° C.; 53% of theory. (The crude hydrobromide was recrystallized directly from the melt obtained.)

(2,6-dichloroanilino)-guanidine

The hydrobromide melted, after recrystallization from alcohol/ether, at 226–227° C.; yield: 61% of theory. (The crude hydrobromide was recrystallized directly from the melt obtained.)

EXAMPLE 3

2-(2,4-dibromophenyl-hydrazino)-$\Delta^2$-imidazoline 6.65 g. (0.025 mol) 2,4-dibromophenyl-hydrazine were melted together with 4.95 g. (0.025 mol) S-methyl-ethylene-thiourea hydrobromide in a vacuum (12 mm. Hg) at 130–140° C. After two hours had elapsed, the cooled melt was recrystallized from isopropanol. There were obtained 8 g. (77.7% of theory) 2-(2,4-dibromophenyl-hydrazino)-$\Delta^2$-imidazoline hydrobromide, which had a melting point of 240° C.

The following compounds were obtained in an analogous manner:

2-(2,5-dichlorophenyl-hydrazino)-$\Delta^2$-imidazoline

The hydrobromide melted, after recrystallization from alcohol, at 262–263° C.; yield: 53.3% of theory.

2-(2,6-dichlorophenyl-hydrazino)-$\Delta^2$-imidazoline

The hydrobromide melted, after recrystallization from alcohol/ether, at 293–294° C.; yield: 61.3% of theory.

2-(2,4-dichlorophenyl-hydrazino)-$\Delta^2$-imidazoline

The hydrobromide melted, after recrystallization from isopropanol, at 230° C.; yield: 69.3% of theory.

2-(3,4-dichlorophenyl-hydrazino)-$\Delta^2$-imidazoline

The hydrobromide melted, after recrystallization from isopropanol, at 217° C.; yield: 53% of theory.

2-(2,3-dichlorophenyl-hydrazino)-$\Delta^2$-imidazoline

The hydrobromide melted, after recrystallization from isopropanol, at 237° C.; yield: 59% of theory.

2-(2,4,6-tribromophenyl-hydrazino)-$\Delta^2$-imidazoline

The hydrobromide melted, after recrystallization from isopropanol, at 246–247° C.; yield: 46% of theory.

2-(4-fluorophenyl-hydrazino)-$\Delta^2$ imidazoline

The hydrobromide melted, after recrystallization from isopropanol, at 183–185° C.; yield: 78% of theory.

The following compounds were also obtained in an analogous manner but in this instance the reaction was carried out while passing through nitrogen:

2-(3-chlorophenyl-hydrazino)-$\Delta^2$-imidazoline

The hydrochloride melted, after amorphous reprecipitation, from alcohol/ether, at 167–170° C.; yield: 53% of theory.

2-(2,4,6-trichlorophenyl-hydrazino)-$\Delta^2$-imidazoline

The hydrochloride melted, after recrystallization from alcohol, at 262–263° C.; yield: 52% of theory.

The compounds of the invention constitute potent antihypertensive agents. The compounds have proved particularly effective in the treatment of patients with severe or sustained elevation of blood pressure, particularly diastolic pressure. The compounds are suitable for use in almost all forms of fixed and progressive hypertensive disease, including that in which blood pressure is moderately elevated. The compounds have also proved effective in renal hypertension, including hypertension secondary to pyelonephritis, glomerulonephritis and renal amylordosis.

The compounds can be administered orally, as pills, tablets, capsules, powders and the like. The preferred form of oral administration is as a tablet containing 10 to 25 mg. of active compound.

The compounds can also be administered parenterally. Injection solutions containing 10 mg./ml. of injection solution are preferred.

The dosage schedule is entirely dependent on the condition of the patient, his response to the treatment and whether or not he is ambulatory or hospitalized. The treatment should be begun with small doses (10 mg.) and increased gradually depending upon the patient's response. The dosage can be increased at 5 to 7 day intervals until an average daily dose of 25 to 50 mg. is reached. Only 1 dose a day is usually required.

In order to establish the effectiveness of the aminoguanidine compounds of the invention as agents for reducing blood pressure a series of tests as follows were carried out.

Rats, each weighing 250–300 g. were used as test animals. Experimental hypertension was induced in these animals by administering to them over a 4 week period 11-desoxy-corticosterone-acetate (5 mg. twice weekly subcutaneously) and by supplying them with a feed containing 10% sodium chloride. After this period, during which experimental high blood pressure had been achieved, an arterial tonometer catheter was surgically implanted into the carotid artery of each of the animals. Blood pressure measurements were carried out using an electromechanical pressure converter (Statham element) and a direct writing system (Schwarzer system) for recording the same. After the control values had been determined, the animals were given the test substance dissolved in physiological saline, the test drugs being supplied by an esophageal catheter. 1, 2 and 3 hours after administration of the test drug, the animals' blood pressure was again determined. All of the values as reported in the Table I which follows represent average values for arterial pressure. The average values determined at the beginning of the experiment, i.e., prior to drug administration amounted to 160–180 mm. Hg. Groups of 10 animals were used in connection with each drug, therefore the average values are averages determined for 10 animals.

As comparison compound, guanethidine (Ismelin Ciba) - [2 - (octahydro - 1 - azocinyl) - ethyl]-guanidine-sulfate was used.

The following compounds were used in the tests:

(A) [2-(octahydro-1-azocinyl)-ethyl]-guanidine-sulfate
(B) 2-(2,4,6-trichlorophenylhydrazino)-imidazoline-$\Delta^2$-hydrochloride
(C) 2-(3-chlorophenylhydrazino)-imidazoline-$\Delta^2$-hydrochloride
(D) (3-chloroanilino)-guanidine hydrochloride
(E) (2,5-dichloroanilino)-guanidine hydrobromide
(F) (2,4,6-trichloroanilino)-guanidine hydrobromide
(G) (2,6-dichloroanilino)-guanidine hydrobromide
(H) 2-(2,6-dichlorophenylhydrazino)-imidazoline-$\Delta^2$-hydrobromide
(I) (3,4-dichloroanilino)-guanidine hydrochloride
(J) 2-(2,4-dichlorophenylhydrazino)-imidazoline-$\Delta^2$-hydrobromide
(K) 2-(4-fluorophenylhydrazino)-imidazoline-$\Delta^2$-hydrobromide The results of the experiment are set out in the table which follows:

TABLE.—BLOOD PRESSURE DECREASE

| Compound: | Dose in mg./kg. oral | Maximal decrease in average arterial blood pressure in pressure in mm. Hg |
|---|---|---|
| A | 50 | 26 |
| B | 12.5 | 47 |
| C | 50 | 18 |
| D | 50 | 37 |
| E | 50 | 48 |
| F | 50 | 40 |
| G | 50 | 21 |
| H | 50 | 38 |
| I | 50 | 33 |
| J | 50 | 46 |
| K | 50 | 44 |

As can be seen from the above table, 50 mg./kg. of the comparison compound guanethidine resulted in a decrease in average arterial blood pressure of 26 mm. Hg, while in all but two instances, the compounds of the invention produce a substantially more marked decrease. In the two instances where the decrease did not exceed that of the control preparation, the values were not significantly different.

It is to be noted in this connection that the use of guanethidine can lead to disturbing and serious clinical problems, in particular adverse reactions resulting from sympathetic blockade. These side effects are not observed in connection with the claimed compounds.

What is claimed is:

1. A therapeutic composition for decreasing blood pressure comprising an effective amount of an amino-guanidine compound of the formula:

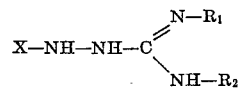

wherein $R_1$ and $R_2$ are individually selected from the group consisting of hydrogen and lower alkyl and X is phenyl substituted by at least one halogen atom; or salts thereof with pharmaceutically acceptable acids; as an active ingredient in admixture with a pharmaceutically acceptable carrier.

2. A therapeutic composition according to claim 1 in dosage unit form.

3. A therapeutic composition according to claim 2 wherein each dosage unit contains from 10 to 25 mg. of active ingredient.

4. Composition as claimed in claim 1 wherein $R_1$ and $R_2$ in said formula are both hydrogen.

5. Composition as claimed in claim 2 wherein said compound is (2,5-dichloroanilino)-guanidine.

6. Composition as claimed in claim 2 wherein said compound is (2,4,6-trichloroanilino)-guanidine.

7. A method of treating hypertension which comprises administering to a mammal an effective amount of a compound according to claim 1.

8. A method treating hypertension according to claim 7 which comprises administering 25 to 50 mg. of said compound daily to said mammal.

References Cited

UNITED STATES PATENTS

| 3,383,409 | 5/1968 | Bream et al. | 424—326 |
| 3,657,337 | 4/1972 | Houlihan et al. | 424—326 |
| 3,658,993 | 4/1972 | Kodama et al. | 424—326 |

OTHER REFERENCES

Usui et al.—Chem. Abst. vol. 67 (1967), p. 32382a.

SAM ROSEN, Primary Examiner